July 3, 1945.   R. P. SCHREIBER ET AL   2,379,459
TEMPERATURE INDICATOR
Filed Feb. 2, 1944
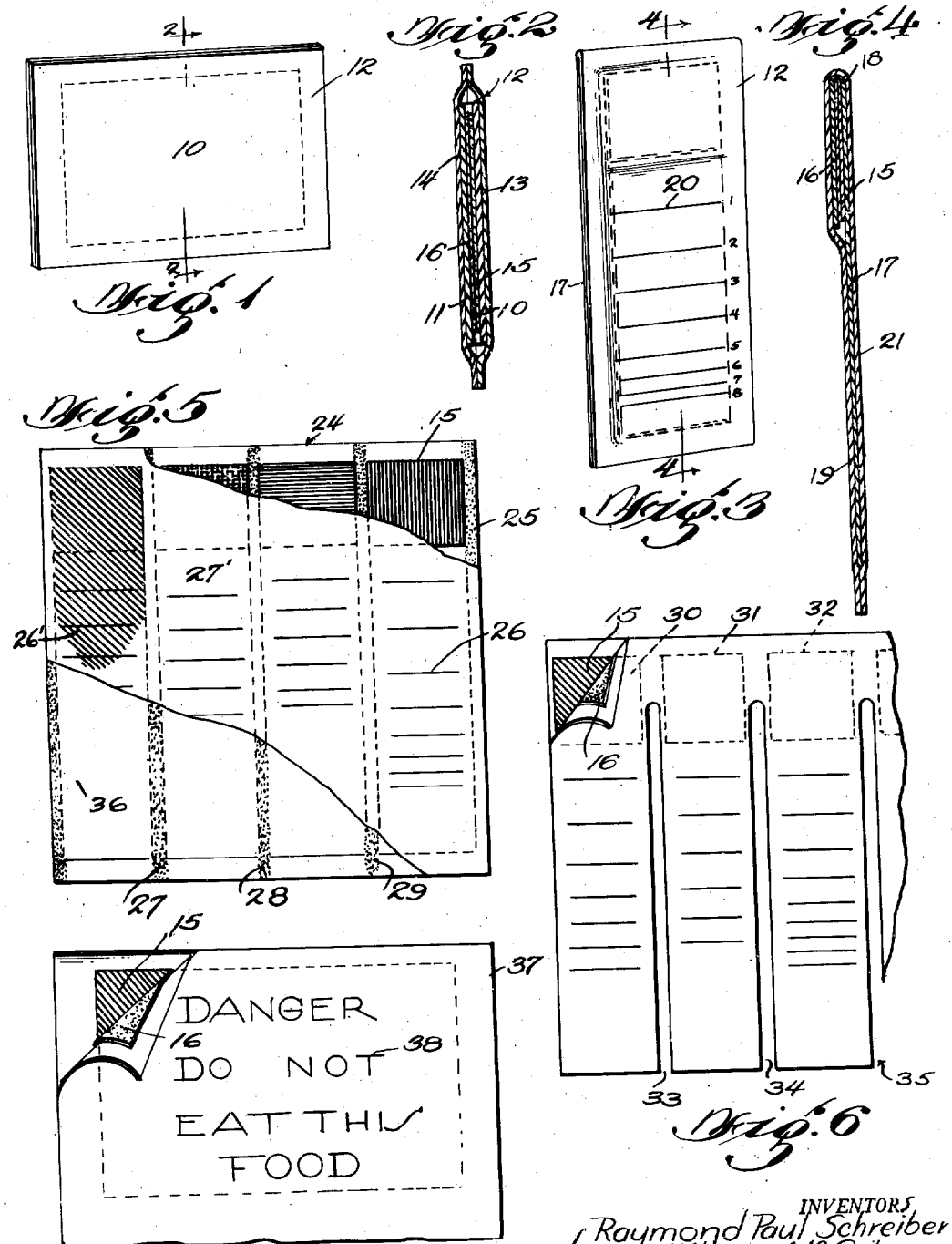
INVENTORS
Raymond Paul Schreiber
William McC. Lee
BY
ATTORNEY Patented July 3, 1945

2,379,459

UNITED STATES PATENT OFFICE 2,379,459

TEMPERATURE INDICATOR

Raymond Paul Schreiber and William McC. Lee, Washington, D. C., assignors to the Government of the United States of America, as represented by the Secretary of War and his successors in office Application February 2, 1944, Serial No. 520,822

9 Claims. (Cl. 73—358)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a means for indicating whether or not stored food has been subjected to excessively high temperatures.

When packaged food has been subjected to temperatures too high for it to be fit for use, as during transportation or storage, particularly under war conditions where delay and adverse conditions are unavoidably encountered, there is frequently no external indication of the fact. Furthermore, the deterioration of the food under excessive heat is often not detected after the packages are opened, so that the food is distributed and eaten with disastrous results.

It is apparent that some simple and inexpensive yet reliable means is needed for indicating when food has been held under conditions which have made it unfit for use. Various prior art devices were investigated by the War Department and found unsuitable either because of bulkiness and expense or inaccuracy of operation or difficulty in determining whether or not change in their appearance had taken place.

It is an object of the present invention to provide an indicator which will show positively after an interval of time whether or not it has been exposed during that time to a certain predetermined temperature higher than is consistent with safe keeping of an object with which the indicator is associated.

It is a further object of this invention to provide a series of indicators affected by different successively higher temperatures, so that a more accurate determination of the highest temperature reached may be provided.

Specifically, it is the object of the invention to provide an indicator employing oil soluble dyes with oil solvents melting at different specified temperatures, so that each oil solvent, as it is softened by the required temperature, will dissolve the dye adjacent thereto, forming an unmistakable indication that the temperature peculiar to the solvent showing the reaction has been reached.

A further object of the invention is to provide an indication which is easily interpreted, since the change is from white to a definite color, and which cannot possibly be effaced once it has operated, since the reaction which causes the stain is irreversible.

Further objects of the invention will be apparent from a consideration of this specification taken in connection with the accompanying drawing, in which:

Fig. 1 is a perspective view of a simple form of the invention involving two sheets of material inclosed in an envelope.

Fig. 2 is a sectional view on the line 2—2 of Fig. 1.

Fig. 3 is a perspective view of a slightly modified form of indicator according to the invention.

Fig. 4 is a sectional view on the line 4—4 of Fig. 3.

Fig. 5 is a further modification of the invention in which a plurality of indicators operable at different temperatures are provided.

Fig. 6 is a plan view of a slightly different embodiment also having plural indicators.

Fig. 7 is a plan view of a modification of the invention in which the indication as developed by exposure to heat is in the form of printed matter.

In Fig. 1 a simple embodiment of the invention is illustrated, comprising two sheets 10 and 11 of unglazed paper, such as filter paper, inclosed in a moisture-proof envelope 12 which is formed of two sheets 13 and 14 of transparent material secured together around their edges. Either the two sheets 10 and 11 or the sheets 13 and 14 forming the envelope 12 may, of course, be formed of a single sheet folded as shown in connection with Figs. 3 and 4.

On sheet 10 there is imprinted a spot, layer or design 15 of an oil soluble dye. Dyes suitable for the purpose are oil violet, oil fast heliotrope, oil fast blue, Sudan blue KA, alizarine cyanine green base, oil fast green, Calcophenyl yellow R, oil fast yellow, Cambelline oil orange, oil orange, cerate red, or oil red. On sheet 11 there is imprinted a layer 16 or matching spots or designs of an oil solvent for the dye. Suitable solvents are:

| Solvents | Melting point |
|---|---|
| | °F. |
| Tridecoic acid | 105 |
| Lauric acid | 110 |
| Pentadecoic acid | 126 |
| Palmitic acid | 145 |

According to the invention the indicators are made up appropriate to the food package with which they are to be associated. In each case a solvent is chosen from the group suggested, or similar solvents, which has a melting point slightly below the point at which the particular food would be harmed, and when the packaged food is prepared for storage or shipment, indicators of the selected type are inclosed with or attached to each unit. Since the dry dye and the solvent are on the inside, the indicator presents a clean white surface as long as it is kept at temperatures below the melting point of the solvent. If at the time the food is to be used the indicator shows, by reason of the solvent having melted and dissolved the dye, forming a stain on the paper, that the danger temperature has been reached, the food must not be used.

In the form of the invention in Figs. 3 and 4 the dye 15 and solvent 16 are printed on adjacent areas near one end of a sheet 17 of an unglazed paper, and the end of the sheet is then folded down at 18 upon the body of the sheet, bringing the dye and solvent imprints into contact, but concealed from the observer. The portion 19 of the sheet which extends below the folded section is calibrated as at 20 with lines successively closer together. The sheet is then inclosed in a transparent envelope 21 formed of a folded sheet secured together around the three open edges by an adhesive or by means of heat and pressure, with or without crimping. In this modification, as in the first form described, a solvent is selected which has a melting point slightly below the maximum temperature to which the food can be subjected without deterioration. If during storage or transportation a higher temperature is encountered, the solvent will melt and will dissolve the dye, which is in contact therewith, and spread it through the unglazed paper, forming a visible stain. The length of the exposure to the excessive temperature can be roughly determined by noting how far the stain has spread through the calibrated area of the sheet, as obviously the longer the period during which the solvent remains in a melted condition the farther the stain will spread.

In Fig. 5 a multiple indicator 24 is illustrated, which is formed in the same fashion as the indicator of Fig. 3, except that a plurality of dye and solvent areas 15 and 16 are provided within the fold at the top of the sheet 25 and a calibrated area 26 extends from each dye and solvent imprint through the body of the sheet. The areas 26 on the sheet 25 can be separated to prevent mingling of the dyes and solvents or travel of the dye stain beyond the desired area by printing or impregnating the unglazed sheet 25 with glazing material in strips 27, 28 and 29 to prevent spreading of the stain. Any substance which will prevent penetration of the paper by the solvent, including lacquers and resins, as well as oil of higher melting points may be employed. The indicating area 26' of the indicator 24 is shown as stained by the dissolved dye, showing that the sheet has been exposed to temperature as high as the melting point of the solvent for that particular area, but not as high as the melting point of the solvent for the next area 27'. By proper calibration of the areas 26' the time of exposure to the melting temperature can be estimated.

In the modification shown in Fig. 6 a plurality of dye patches 30, 31 and 32 are provided each comprising a dye imprint 15 and a solvent imprint 16 and having a calibrated area adjacent thereto. The portions of the sheet peculiar to each indicator area are separated from one another by slots 33, 34 and 35 so that travel of the stain from one area to adjacent areas is prevented. Both forms, as shown in Figs. 5 and 6, are enclosed in transparent envelopes preferably of thermoplastic material, as indicated at 36 in Fig. 5.

In Fig. 7 an indicator 37 of somewhat larger size but similar to that shown in Fig. 1 is provided with a printed warning 38, as "Do not eat this food" or "Examine food carefully for possible spoilage." This design is formed either by printing the solvent or the dye or both in the required pattern, or by printing the unglazed paper with glazing material in the required design. In both cases the printed material may represent either the words themselves or the background for the words, in two cases the words remaining undyed while the background is dyed and in the other two the words appearing stained on a white background.

In each of these forms the dyes selected should have the following characteristics; it should be suitable after solution in solvent used for dyeing paper, and should be relatively insensitive to light and moisture. The dye solvent should have the following properties; it should melt sharply at the desired temperature, it should be relatively insensitive to light and moisture and should be a good solvent when melted for the dye used. In any of the forms shown one side of the filter paper, if it is to be exposed on the surface of the food package, may be printed or otherwise colored black to seal the contents of the pocket from deteriorating light waves. The sealed transparent envelope as provided protects the indicator against moisture.

Various color dyes may be used particularly in the forms involving a plurality of indicating areas such as—

|  | °F. |
|---|---|
| Green for | 100 |
| Yellow for | 110 |
| Blue for | 120 |
| Red for | 130 |

In each case the melting temperature of the solvent will be selected according to the packaged food with which it is to be used and the capability of the food to withstand high temperatures. Instructions to army personnel can also be provided to enable them to determine whether the food has been sufficiently heated or heated for a period sufficiently long to render it entirely unfit for use or whether it may be tested or used in emergencies.

Having thus described our invention what we claim and desire to secure by United States Letters Patent is:

1. An indicator for temperatures reached while an object is not under observation, comprising a sheet of absorbent material bearing a dye substance and a sheet bearing a solvent which liquefies at a temperature which should not be exceeded and means for maintaining the two sheets in cooperative relationship whereby the dye substance and solvent come in contact with each other.

2. A temperature indicator comprising a sheet of absorbent material having a dry dye printed on one face and a sheet having printed thereon a solid solvent for said dye liquefiable at the temperature to which the indicator is designed to respond, and means to secure the two sheets together with the printed faces in contact.

3. An indicator as set forth in claim 2 in which the sheet material is encased in a moisture proof transparent envelope.

4. An indicator as set forth in claim 2 in which one sheet of material is light proofed on one side and the two sheets are inclosed in a moisture resistant transparent envelope.

5. An indicator as set forth in claim 2 having certain portions of the absorbent sheet treated to resist the solvent whereby a pattern or message will be formed thereon by the dyeing of the untreated portions of the sheet when the solvent is melted.

6. A temperature indicator comprising a sheet of absorbent material having a series of imprints of dry dyes of different colors and imprints of solvents for said dyes adjacent thereto, the solvents melting at successively higher temperatures along the series whereby the successive appearance of the spots of different colors indicate a rise in temperature as high as the melting point of the solvent for that color.

7. An indicator as set forth in claim 6, each dye and solvent imprint having a calibrated area adjacent thereto whereby the duration of the excessive temperatures can be estimated from the spread of the dye spots in the calibrated areas.

8. A temperature indicator as set forth in claim 6 in which the areas of the sheet material adjacent each dye and solvent imprint are set off by areas of the sheet impermeable to the solvent.

9. A temperature indicator as set forth in claim 6 in which the areas of the sheet material adjacent each dye and solvent imprint are separated by slots cut between the areas and extending part way between the imprints.

RAYMOND PAUL SCHREIBER.
WILLIAM McC. LEE.

CERTIFICATE OF CORRECTION.

Patent No. 2,379,459.  July 3, 1945.

RAYMOND PAUL SCHREIBER, ET AL.

It is hereby certified that error appears in the printed specification of the above numbered patent requiring correction as follows: Page 1, second column, line 34, for "Sudan blue KA" read --Sudan blue GA--; and that the said Letters Patent should be read with this correction therein that the same may conform to the record of the case in the Patent Office.

Signed and sealed this 2nd day of October, A. D. 1945.

Leslie Frazer (Seal)  First Assistant Commissioner of Patents.

and the two sheets are inclosed in a moisture resistant transparent envelope.

5. An indicator as set forth in claim 2 having certain portions of the absorbent sheet treated to resist the solvent whereby a pattern or message will be formed thereon by the dyeing of the untreated portions of the sheet when the solvent is melted.

6. A temperature indicator comprising a sheet of absorbent material having a series of imprints of dry dyes of different colors and imprints of solvents for said dyes adjacent thereto, the solvents melting at successively higher temperatures along the series whereby the successive appearance of the spots of different colors indicate a rise in temperature as high as the melting point of the solvent for that color.

7. An indicator as set forth in claim 6, each dye and solvent imprint having a calibrated area adjacent thereto whereby the duration of the excessive temperatures can be estimated from the spread of the dye spots in the calibrated areas.

8. A temperature indicator as set forth in claim 6 in which the areas of the sheet material adjacent each dye and solvent imprint are set off by areas of the sheet impermeable to the solvent.

9. A temperature indicator as set forth in claim 6 in which the areas of the sheet material adjacent each dye and solvent imprint are separated by slots cut between the areas and extending part way between the imprints.

RAYMOND PAUL SCHREIBER.
WILLIAM McC. LEE.

CERTIFICATE OF CORRECTION.

Patent No. 2,379,459.  July 3, 1945.

RAYMOND PAUL SCHREIBER, ET AL.

It is hereby certified that error appears in the printed specification of the above numbered patent requiring correction as follows: Page 1, second column, line 34, for "Sudan blue KA" read --Sudan blue GA--; and that the said Letters Patent should be read with this correction therein that the same may conform to the record of the case in the Patent Office.

Signed and sealed this 2nd day of October, A. D. 1945.

Leslie Frazer (Seal)  First Assistant Commissioner of Patents.